United States Patent [19]
Sobocinski

[11] Patent Number: 5,247,311
[45] Date of Patent: Sep. 21, 1993

[54] LORO ANTENNA AND PULSE PATTERN DETECTION SYSTEM

[76] Inventor: Richard S. Sobocinski, 185 Ridgeway Rd., Hillsborough, Calif. 94010

[21] Appl. No.: 896,338

[22] Filed: Jun. 10, 1992

[51] Int. Cl.$^5$ ............................ C01S 3/02; C01S 1/44; C01S 1/16/13/74
[52] U.S. Cl. .................................. 342/453; 342/398; 342/458; 342/408; 342/47
[58] Field of Search ............... 342/386, 398, 450, 453, 342/458, 137, 47, 408, 195, 189, 428

[56] References Cited

U.S. PATENT DOCUMENTS

| | | | |
|---|---|---|---|
| 3,713,161 | 1/1973 | Rice | 342/455 |
| 3,858,211 | 12/1974 | Litchford | 342/37 |
| 4,438,439 | 3/1984 | Shreve | 342/449 |
| 4,670,757 | 6/1987 | Munich et al. | 342/450 |
| 4,721,958 | 1/1988 | Jenkin | 342/13 |
| 4,733,241 | 3/1988 | Litchford et al. | 342/453 |
| 4,879,561 | 11/1989 | Inkol | 342/195 |
| 4,882,590 | 11/1989 | Huss et al. | 342/453 |
| 4,910,526 | 3/1990 | Donnangelo et al. | 342/455 |

*Primary Examiner*—Gregory C. Issing

[57] ABSTRACT

A passive surveillance method and system, capable of operation in conjunction with both non synchronous and synchronous pulse pattern rotating ground radars. Received signal scan modulated pulses are deinterleaved and correlated with a previously selected repetitive portion of an interrogation signal source base pulse pattern. A single receiver channel, sequential lobe on receive only (LORO) direction finding antenna is employed in the system to modulate received signals to extract target object relative bearings for the correlated signals. The system makes use of all available data to determine the best estimate of the target object position.

3 Claims, 2 Drawing Sheets

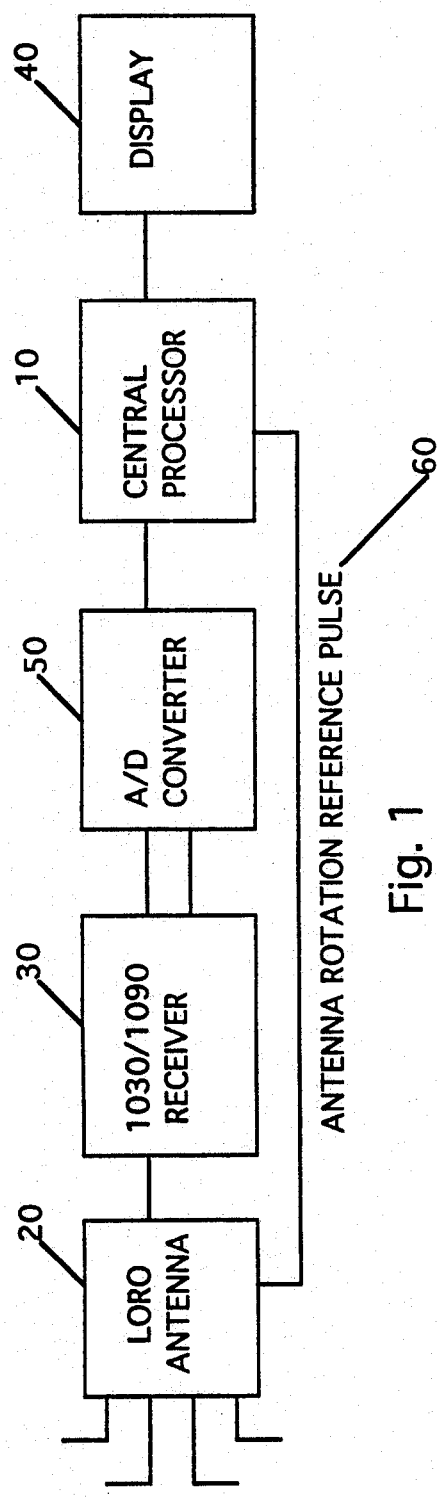
Fig. 1
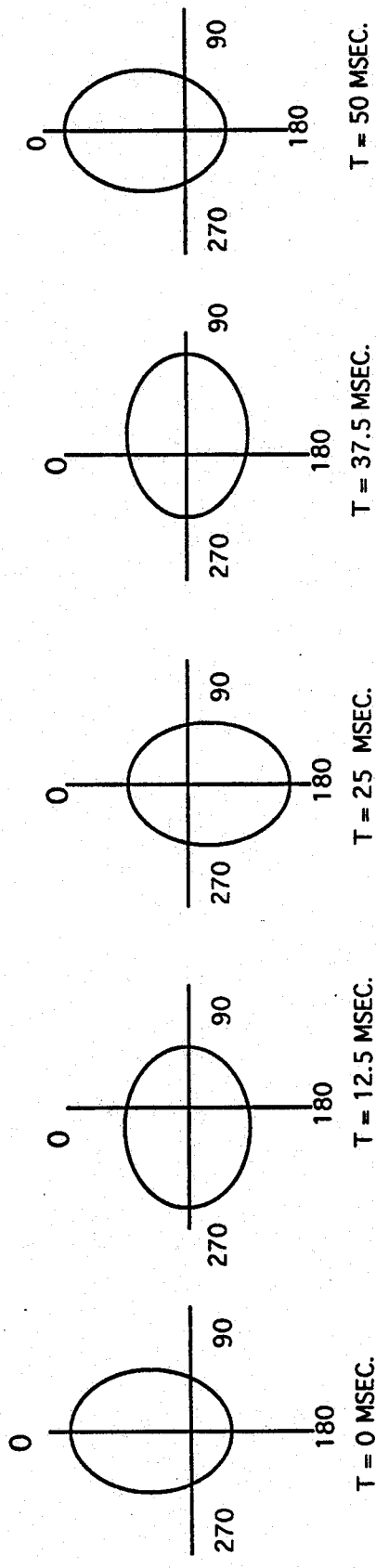
Fig. 2 a  T = 0 MSEC.
Fig. 2 b  T = 12.5 MSEC.
Fig. 2 c  T = 25 MSEC.
Fig. 2 d  T = 37.5 MSEC.
Fig. 2 e  T = 50 MSEC.

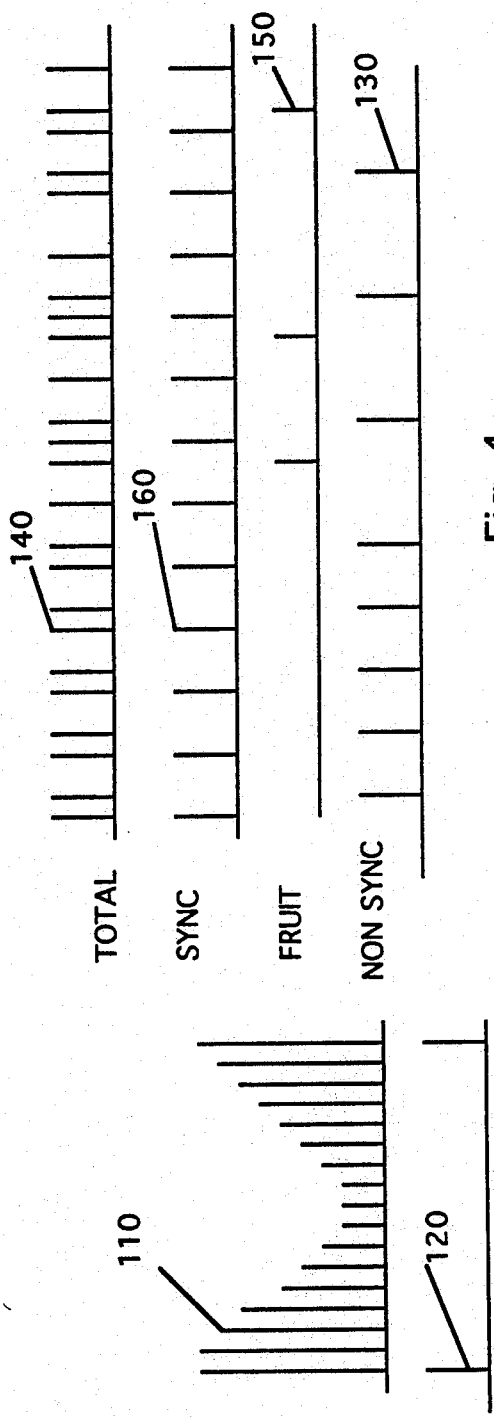
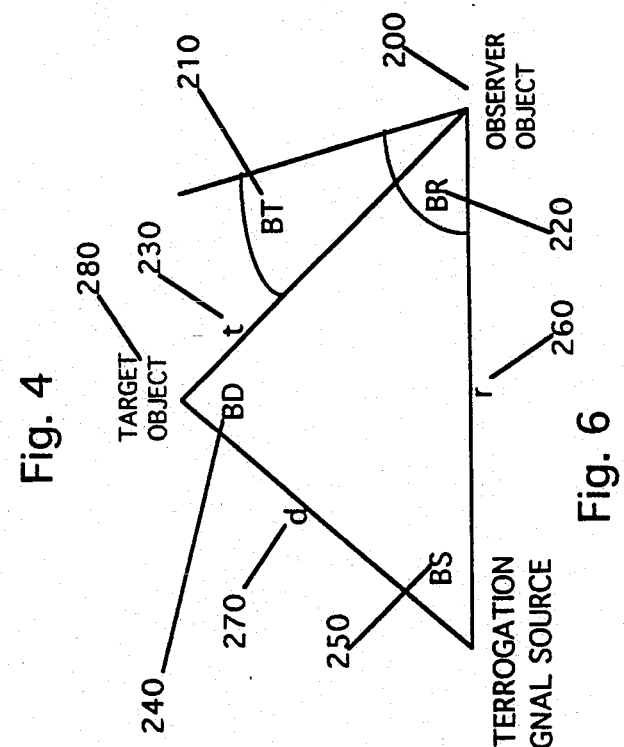
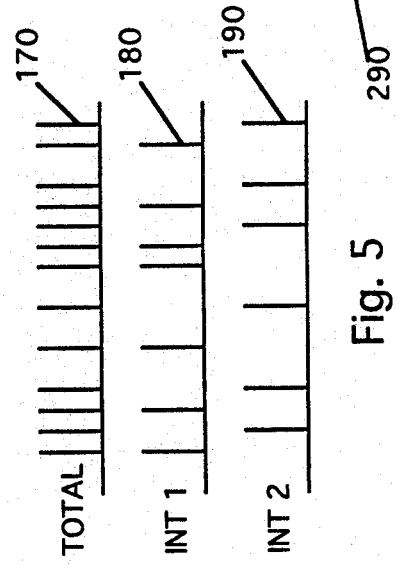

LORO ANTENNA AND PULSE PATTERN DETECTION SYSTEM

FIELD OF THE INVENTION

The invention relates to a surveillance system for determining the presence and location of transponder equipped target objects operating in the presence of an observer object location. More particularly, the present invention relates to an airborne surveillance system for determining range, bearing and velocity information of target objects relative to an observer object in conjunction with non synchronous as well as synchronous pulse repetition rate interrogation signal sources such as an ASR-9 ground radar.

A characteristic of this invention is that relative bearings of the observer object positions are obtained by use of a single rf channel lobe on receive only (LORO) direction finding antenna. Also, non synchronous pulse pattern interrogation source signals are deinterleaved to determine the basic repetitive portion of the pulse pattern. One or more of these base pulse patterns are selected to be used as a reference to correlate desired signals to be processed. This solves the ASR-9 non synchronous pulse correlation problem resident in previous designs. Previous system implementations require a fully synchronized, repetitive interrogation pulse pattern reference. These designs require a prediction of delta time of arrivals between the interrogation and resulting target reply pulses. This invention does not utilize the predictive delta time of arrival relationship for non synchronous radars. Delta time of arrival is used only to obtain target object range for synchronized radars.

BACKGROUND OF THE INVENTION

Transponder frequency proximity warning systems are represented in U.S. Pat. No. 3,713,161 by Rice. Transponder only systems detect the target object transponder replies to interrogations. These systems normally do not use relative bearing data.

Transponder only systems detect the bracket pulses of the target object replies. The range to the target object is computed by use of the signal strength of its reply. These systems suffer in accuracy from the wide range of transmitted power in airline and low cost general aviation transponders.

Also, the use of transponder reply bracket pulses without interrogation signal source pulse reference correlation filtering results in fruit and garble corruption of the data. This corruption produces a significant number of false alarms.

Without time reference to the interrogation pulses, the transponder signal processing systems cannot accurately determine if the transponder reply was in response to a mode A or a mode C interrogation. Therefore, transponder reply only systems cannot effectively separate target transponder reply altitude or identification data frames.

Previous systems obtain relative bearing data using traditional multiple receiver channel, monopulse amplitude or phase based antenna direction finding technology. These receiver designs require complicated and costly multichannel microwave receiver equipment.

U.S. Pat. No. 3,858,211 issued to Litchford uses predictive timing of synchronous interrogation signal source pulse reference to correlate the target object transponder reply pulses. This method produces accurate range and bearing of the transponder reply, using a single receiver rf channel omnidirectional antenna for processing synchronous interrogation signals. The Litchford differential timing pulse method improves on the simple transponder reply receive only bracket pulse designs. An interrogation signal source based timing reference is used to develop a differential time of arrival range with respect to the target object replies. This time of arrival data is used to calculate target object position. The Litchford correlated dual frequency signal processing method provides a means of filtering uncorrelated replies from desirable sources. The filtering is accomplished by providing a predicted synchronous timing reference for transponder replies to the interrogation pulses. Utilizing the predicted interrogation pattern as a reference provides the capability to extract identification and altitude data from the transponder reply signals. The Litchford time differential method relies on flywheel prediction of the time of arrival of the interrogation signal source pulse reaching the observer object when the interrogation signal source is pointing away from the observer object and no interrogation signal is being received.

The Litchford method works well for continuously synchronous interrogation signal source pulse repetition patterns. In the next few years, over fifty percent of the interrogation signal sources will be ASR-9. The synchronous Litchford design has difficulty with the ASR-9, because its interrogation pattern is not synchronous. The ASR-9 has a variable ratio short and long pulse repetition pattern. The number of the pulses is dependent on ASR-9 antenna scan rate variations. At the end of an approximate 1.4 degrees of antenna azimuth travel, the ASR-9 adds or deletes pulses, depending on how much the rotation rate of the antenna is modified by wind loading. The target object transponder replies will no longer be synchronized with a continuously predictable interrogation pulse pattern. Thus, target object transponder replies will become uncorrelated and random with respect to the synchronous predicted interrogation pulse reference of the Litchford design. This makes the differential time range prediction unusable, unless the interrogation signal source pulses can be continuously monitored and the actual interrogation pulse correlated with each target object transponder reply pulse. Reliable continuous receipt of the interrogation pulses can only be achieved near the interrogation signal source.

U.S. Pat. No. 4,910,526 issued to Donnangelo et al uses a multichannel phase monopulse antenna to obtain the relative bearing of the interrogation and the target object transponder replies. The system performs a three dimensional, direction cosine vector, Kalman filtered solution which requires external aircraft position data. For the case of multiple interrogation signal sources, the space position of the observer object is determined by relative bearing triangulation of the available interrogation signal sources. Observer object altitude data is also required.

The Donnangelo primary means of target position determination uses multiple interrogation signal source data, target object pointing angle, relative bearing target data along with observer and target altitude to compute the target position.

The Donnangelo solution degrades for multiple interrogation signal source triangulation solutions when target altitude data is not available and also for single interrogation signal source geometry solutions. In these cases, the Donnangelo system relies on the Litchford type flywheeled synchronous predictive delta time of arrival data. This delta time range data is used to iterate the solution to a target position and to correlate mode C altitude. This synchronous interrogation signal source reference data will not be available when using non synchronous ASR-9 type signal inputs.

OBJECTS OF THE INVENTION

It is an object of the present invention to provide a proximity indicating surveillance system for detecting, locating and tracking target objects equipped with a transponder responsive to as few as one scanning interrogation signal source that is either non synchronous or synchronous. The invention uses completely passive means without any external equipment data inputs.

It is another object of this invention to provide a proximity indicating surveillance system for determining the relative bearing of the interrogation signal source and the relative bearing of the target object transponder signals by use of a single rf channel lobe on receive only (LORO) antenna. The LORO antenna pattern is rotated at a rate optimized for the interrogation signal source antenna scan/pulse rate combination. This produces a modulated received signal waveform superimposed on the pulses. The modulation phase is proportional to relative bearing of the signal source.

It is another object of the present invention to provide a proximity indicating surveillance system to measure the repeatable base pulse repetition pattern of the interrogation signal source pulses during its illumination of the observer object vehicle. This measured base pulse repetition pattern is used as the signal deinterleaving process reference and to calculate the interrogation signal source antenna nominal scan rate.

Another object of the present invention is to provide a proximity indicating surveillance system for detecting targets by deinterleaving all transponder replies and correlating those reply pulse patterns that match the selected interrogation signal source basic predictable pulse pattern. This correlated transponder data is used to determine the relative bearing angle for each set of selected modulated transponder reply pulses by utilizing the modulation reference data obtained from the LORO direction finding antenna.

It is an additional object of the present invention to calculate the range of the target object with respect to the observer object by using up to three equations. The first equation of target range calculation uses target object relative bearing along with target object range derived from signal strength versus range formulas.

The second equation for target object range calculation uses interrogation signal source range derived from signal strength versus range formulas, inscribed interrogation signal source antenna pointing angle between the target object and the observer object and also target object relative bearing from the observer object reference axis.

The third equation for target object range calculation is applied for synchronous interrogation signal sources. The calculation uses interrogation signal source range derived from signal strength versus range formulas, inscribed interrogation signal source antenna pointing angle between the target object and the observer object, target object relative bearing with respect to the observer reference axis and also delta time of arrival range.

It is an additional object of the present invention to utilize a proximity indicating surveillance system to determine the relative collision threat created by each target aircraft and display these collision threats to the pilot.

SUMMARY OF THE INVENTION

The preferred embodiment of this invention provides a self contained system without inputs from any external source.

The preferred embodiment has the implementation shown in the block diagram of FIG. 1. The system initially stores in memory the characteristics of the interrogation signal sources in the area of use. These data are updated in flight. The system searches to match a pulse pattern to select the optimum geometry interrogation signal source, normally perpendicular to the observer object flight path. The search starts with the last interrogation signal source being used at the time of system turn off.

This embodiment provides reliable relative bearing and range estimation to a target object for both non synchronous and synchronous interrogation signal sources. The method also correlates deinterleaved target object transponder pulse patterns with the interrogation base pulse repetition pattern reference for any non synchronous interrogation signal source that has at least a repeatable predictable base pulse repetition pattern, such as the ASR-9.

The preferred embodiment system uses a lobe on receive only (LORO) antenna with an antenna pattern scan rotation rate optimized to a selected interrogation signal source. This sequential LORO operation only requires one rf receiver channel to effect a solution. Bearing data is derived by rotating a shaped antenna pattern so as to induce a modulation cycle on each set of received signal pulse groups. The received signal modulation has a phase relationship as a function of angle off of the observer object reference axis. The modulation phase with respect to the antenna rotation phase reference produces the desired relative bearing data.

The interrogation signal source pulses are de-interleaved during beam passage past the observer object. The base pulse repetition pattern of the selected interrogation signal sources is measured. This pulse pattern is used later as the reference to deinterleave and correlate the desired target object replies to the selected interrogation signal source. The mode A and mode C sequence of the interrogations is also measured.

Synchronous radars have interrogation pattern groups that have cycles in the range of 16 different time periods before repeating the cycle. The ASR-9 primary radar has one basic, repetitive pulse pattern of two sets of 10 short and 8 long interrogation pulses in 1.4 degrees rotation. Additional long pulses at the 1.4 degree scan boundary can increase the last set of pulses to 21.

Target transponder returns are received and time of arrival of the pulses established. These time based pulses are deinterleaved, using methods well known in the art, to determine the received pulse pattern for each transponder reply. This transponder pattern is then matched with the interrogation base pulse repetition pattern of the selected interrogation signal sources. This process is used to determine the signals that will be used for further processing.

By only accepting transponder replies that match the repeatable portion of the basic pulse pattern, this invention's deinterleaving method will reject fruit and replies from non selected base pulse repetition patterns.

The interrogation signal source inscribed pointing angle between the observer object and the target object at the time o receipt of the transponder replies is measured. This is obtained by recording the system time between successive interrogation signal source beam passages past the observer object to determine the average antenna rotation rate.

The LORO antenna system obtains the relative bearing and signal power from the observer object to the correlated target object transponder replies. The relative bearing and power derived range to the interrogation signal source from the observer object is then calculated using the deinterleaved interrogation pulses with respect to the LORO scan reference.

The correlated pulse base pulse patterns from the target object transponder replies and interrogation signal source data are used to compute the relative bearing and range of the target objects from the observer aircraft.

The target objects are displayed to the pilot upon defining parameters such as bearing, range, altitude and heading vector trend.

This invention's deinterleaving base pulse pattern implementation can be utilized with any direction finding system that provides a relative bearing and a received signal power output. Therefore, reliable non synchronous ASR-9 processing capability can be added to current passive TCAS I designs that implement multichannel monopulse direction finding antennas. The preferred embodiment of this invention utilizes a unique sequential signal processing direction finding antenna which requires only one RF receiver signal processing channel.

DESCRIPTION OF THE DRAWINGS

FIG. 1 Pulse pattern and LORO antenna system block diagram

FIG. 2 LORO antenna horizontal plane scan pattern and timing

FIG. 3 LORO antenna received signal modulation

FIG. 4 Pulse pattern deinterleaving process

FIG. 5 Interrogation signal source deinterleaving process

FIG. 6 Target object position calculation geometry

DESCRIPTION OF THE PREFERRED EMBODIMENT

FIG. 1 is a schematic block diagram of an overall hardware system of the preferred embodiment. A central processor unit 10 processes a variety of data to develop observer and target relationships relative to one or more interrogation signal sources. This data is utilized to calculate the best estimate position of target object positions.

The invention described in the preferred embodiment includes a four element Lobe On Receive (LORO) direction finding antenna 20. A LORO antenna is implemented using a shaped pattern that is rotated in bearing with time. Each of the four antenna signal path gains are varied with respect to time to rotate the shaped received pattern at a specified angular rate. A shaped antenna pattern produces a modulation in signal strength of the pulses received from a signal source positioned at some relative angle with respect to a rotating antenna received signal pattern as shown in FIG. 3. The preferred embodiment provides for a sinusoidal modulation variation with angle. An antenna pattern is shaped so that the 180 degree antenna pattern gain is a fixed db less than at 0 degrees. FIG. 2 shows a antenna receiver gain relationship at the cardinal positions with respect to time of rotation. Other antenna pattern shapes can be mechanized to provide required relative bearing determination reference modulations. LORO antenna 20 design and pattern rotation design processes are well known in the art. A rotating antenna pattern is asymmetrical, such that a pattern provides a characteristic modulation 110 in FIG. 3 on the 16 or more received pulses from either interrogation signal sources or the target objects. The 0 degree phase shift of the amplitude modulation on received pulses 110 in FIG. 3 with respect to a 0 degree antenna rotation reference position pulse 120 results from a target object that is at a relative 0 degree relative bearing angle with respect to the vehicle reference axis. This relative modulation phase shift relationship provides the desired angle data. This embodiment specifically sequences a received antenna pattern rotation to extract the proper angle data at a rate that is optimal for the selected terminal radar interrogation signal source scanning patterns. This embodiment uses a four lobe amplitude modulation implementation. However, other numbers of lobes and phase modulation characteristics can be used. The requirement is to obtain enough received pulses per 360 degree LORO antenna beam rotation to match the selected interrogation signal source antenna scan rate and pulse rate scan across a target object.

Most interrogation signal sources produce about 300 interrogation per second in sets of three pulses. For a typical terminal radar with a 5 second rotation period, there will be 1,500 interrogation sets per revolution. Enroute interrogation signal source antenna scans are in the region of 12 seconds per revolution. A terminal radar scan rate is implemented for the preferred embodiment. During a 1.4 degree basic pulse pattern interval of an ASR-9, there will nominally be sets of 18 beacon pulses. For non ASR-9 radars, synchronous transponder returns provide about 16 reply sets of pulses between half power points of an interrogation signal source antenna beam during the time that an antenna interrogates a specific target object. These interrogation signal source parameters require that a LORO antenna scan pattern defined in this invention rotate 360 degrees every 53.3 msec. This rotation rate will then achieve a full cycle scan of modulated pulse data for pulse sets received for each target.

A LORO antenna system also provides an antenna rotation reference signal 60 in FIG. 1 each time that a maximum LORO antenna axis passes the reference angle. This reference is used by a central processor unit 10 to determine the relative bearing of target object replies by comparing the phase of a received pulse amplitude modulation 110 with that of an antenna rotation reference signal 120 as shown in FIG. 3.

Output signals from a direction finding antenna are processed in a direction finding receiver 30 shown in FIG. 1. Radio frequency 1030/1090 MHz. signals are amplified and separated into analog video interrogation signal source pulses and target object pulses. The rf design is well known in the art.

The direction finding receiver 30 produces video outputs which are analog to digitally converted in an A/D Unit 50. The outputs of the analog digital converter are representative of the interrogation signal source and target object transponder signals received in each LORO antenna rotation.

An A/D converter unit 50 converts and stores the interrogation signal source or target object pulse data for later calculations. In order to insure adequate overlapped signal discrimination, each transponder pulse is sampled four times. Other sample rates can be used to match the processing requirements. Each sample has pulse amplitude, pulse start time and pulse end time data stored in a central processor 10 data buffer.

As defined in the U.S. Pat. No. 3,858,211 Litchford patent, timing of successive passes of the interrogation signal source antenna past the observer object are used in the geometry calculations to predict the pointing angle of the interrogation signal source for the time that selected target object transponder returns are received. Selected interrogation signal source antenna mode A/C pattern, scan rate and position with respect to time are then calculated and updated when the beam passes the observer object. Typical deinterleaving of interrogation P1/P2/P3 pulse set patterns from the total received signal is shown in FIG. 5. The total received signals 170 are deinterleaved into two interrogation signal sources 180 and 190.

One or more interrogation signal sources have their interrogation basic pulse pattern recorded when an interrogation signal source antenna beam passes own aircraft. In the case of an ASR-9, the basic pattern of 18 provides a group of short pulses and long pulse interrogations 190 in FIG. 5 prior to a 1.4 degree angle gate that starts the pattern cycle over again after two sets of the primary radar patterns. If the antenna is traveling at a rate different than nominal, the number of long pulses will be reduced or increased depending on whether the antenna is traveling faster or slower than nominal. Extra long period pulses are used as fillers. A beacon unit divides the primary radar patterns of 42 by two or three. Therefore, there will be 14 to 21 transponder replies per dual set of primary radar pulses. This base pulse pattern method can also be used for synchronous radars since they produce a have a repetitive pattern of up to about 16 levels during each interrogation signal source beam passage. A synchronous interrogation signal source is fully repeatable and predictable.

This invention embodiment adds the dimension of using only a base pulse repetition pattern of a selected interrogation signal source to accomplish correlated deinterleaving of signals. This embodiment identifies desired target object transponder replies 110 in FIG. 3 to be used for calculations by correlating their deinterleaved pulse repetition pattern to a selected interrogation signal source base pulse repetition pattern 130 as shown in FIG. 4. Pulses are deinterleaved using algorithms well known in the art.

A typical set of reply signal sets are shown in FIG. 4. These sets are the same for target objects and interrogation signal sources, except for pulse group content. Target objects have altitude and identification pulse data groups and interrogation signal sources have the triplet pulse group data. These pulse groups have a time base in the microsecond range. Target object transponder replies 140 are deinterleaved to segregate returns 130 and 160 that have repetitive pulse patterns. This computer deinterleaving process separates the pulses into a sets from synchronous interrogation signal sources 160, non synchronous interrogation signal sources 130 and unwanted extraneous fruit signals 150. A central processing unit 10 deinterleaving process uses the change of the ASR-9 interrogation pulse rate from fast to slow as shown in a non synchronous signal 130 to index the received pulse set patterns. Only those target reply patterns that correlate with the patterns of a selected interrogation signal source base pulse repetition pattern will be processed for target calculations.

Target object position is calculated using the geometry defined in FIG. 6. An interrogation signal source relative bearing BR 220 or a target object relative bearing angle BT 210 are derived from a LORO antenna output data of bearing and signal power. A correlated base pulse repetition pattern received pulse group for each target object has a modulation phase 110 in FIG. 3 compared to the phase of an antenna rotation reference phase signal 120 received from a LORO antenna. Received signal power/range curves are calculated for each interrogation signal source range r 260 and for target object range t 230. Signal strength power ranges r 260 and t 230 are calculated by averaging the modulated pulse set signal values received from the LORO antenna for the typical 16 interrogations per each interrogation signal source antenna pass.

Interrogation signal source mode A and mode C sequence data, when available, are used to display the target object identification and altitude. The A/C sequence measured at the time of passage past the observer object is used to determine the identification or altitude values of the target object responses.

A central processing unit 10 utilizes the above inputs to resolve a position and a relative velocity of the observer object with respect to all other target objects. A relative bearing of the target object BT 210 is always obtained from a LORO directional antenna angle data stored from a LORO antenna angle unit 20 output. Three possible range to target object t 230 values may be calculated. The one selected will depend on that most accurate for the geometry relationships in current use.

A first target object range t 230 calculation uses direct correlated target object data obtained from received pulse signal strength, compensated for bearing modulation of the signal amplitude. The calculation uses a signal strength versus range transformation calculation. Correlated target returns will nominally have an average of 16 values. The average of the sets is used directly to display a centermarked target position.

A second target object range calculation uses the law of sines relationship for data obtained from non synchronous or synchronous interrogation signal sources. The geometry is shown in FIG. 6.

The range to a target object (t) is computed from the following equation.

$$t = \frac{r \sin BS}{\sin BD}$$

where:
 t = Range from observer object to target object
 r = Range from observer object to interrogation signal source object

BD = 180 − BS − BR + BT

BS = Inscribed interrogation signal source antenna between observer and target objects
BR = Relative bearing to interrogation signal source from observer object reference axis BT = Relative bearing to target object from observer object reference axis Since the transmitted power of an interrogation signal source is normally accurately calibrated and maintained, this calculation will provide improved accuracy over the transponder signal strength derived range t 230.

A third target range calculation is used if an interrogation pulse pattern is continuously synchronous. Range to the target object t 230 is then computed from the law of cosines equation.

$$t = \frac{r^2 + K^2 - (K)2r \cos BS}{2K - (2r \cos BS)}$$

where:
t = Range from observer object to target object
r = Range from observer object to interrogation
BS = Inscribed interrogation signal source antenna between observer and target objects K = del + r del = range derived from time difference between predicted interrogation signal source pulse and target reply received at observer object Note: del = [(d+t)−r]

d = Range from the interrogation signal source to the target object

A central processing unit 10 performs the above functions to update the data each interrogation signal source antenna revolution. This data includes the position and relative velocity information of the observer object and all the target objects. The process displays the target object as a symbol with the computed relative bearing, range, altitude, and previous track history. A resulting preferred embodiment display 40 interfaces with the pilot.

The above description of the preferred embodiment describes one form taken by the present invention. It should be understood that myriad variations and alterations may be performed within the teachings of the present invention. While the preferred embodiment is described with reference to the above presented specification and the accompanying drawings, the scope of the present invention is defined solely by the appended claims.

I claim:

1. A method for determining the relative position of an observer object from at least one set of target object transponder replies by measuring bearing and range from said observer object in an environment having at least one rotating pulsed synchronous or non synchronous interrogation signal source, said method comprising:
   (a) receiving said interrogation signal source and said target object reply signals with a multi element antenna,
   (b) varying the attenuation of each of said multi element antenna received signal paths with time to result in a rotating shaped antenna pattern in space,
   (c) controlling said shaped antenna pattern rotation rate to be at least one revolution during each said interrogation signal source beam passage over said target object,
   (d) generating an antenna rotation reference signal each time said shaped antenna pattern maximum received signal position passes a specified reference direction angle,
   (e) summing said multi element antenna signal paths onto a single microwave receiver channel,
   (f) determining a base pulse repetition pattern on at least one set of said interrogation signal source signals by a pulse deinterleaving process,
   (g) determining a target pulse repetition pattern by a pulse deinterleaving process on at least one said target object transponder reply,
   (h) determining a matched pulse pattern for at least one said target pulse repetition pattern that correlates with said base pulse repetition pattern of said interrogation signal source,
   (i) determining at least one target object relative bearing angle BT by measuring the phase of the amplitude modulation envelope on said matched pulse pattern with respect to said antenna rotation reference signal,
   (j) determining at least one interrogation signal source relative bearing angle BR by measuring the phase of the amplitude modulation envelope on said base pulse repetition pattern with respect to said antenna rotation reference signal,
   (k) determining at least one interrogation signal source object range r by use of signal strength versus range transformation calculations for said base pulse repetition pattern signal pulse amplitudes,
   (l) determining the speed of rotation of said interrogation signal source antenna by measuring the time interval between successive sweeps past said observer object,
   (m) determining an inscribed angle BS from said speed of rotation by measuring a time between said target pulse repetition replies and said interrogation signal source antenna illumination of said observer object,
   (n) calculating at least one target object range t by using said representations BT, BR, r and BS,
   (o) calculating the relative position of the observer object from at least one said target object using said representations BT and t.

2. A method for determining the relative position of an observer object from at least one set of target object transponder replies by measuring bearing and range from said observer object in an environment having at least one rotating pulsed synchronous interrogation signal source, said method comprising:
   (a) receiving said interrogation signal source and said target object reply signals with a multi element antenna,
   (b) varying the attenuation of each of said multi element antenna received signal paths with time to result in a rotating shaped antenna pattern in space,
   (c) controlling said shaped antenna pattern rotation rate to be at least one revolution during each said interrogation signal source beam passage over said target object,
   (d) generating an antenna rotation reference signal each time said shaped antenna pattern maximum received signal position passes a specified reference direction angle,
   (e) summing said multi element antenna signal paths onto a single microwave receiver channel,
   (f) determining a base pulse repetition pattern on at least one set of said interrogation signal source signals by a pulse deinterleaving process, (g) determining a target pulse repetition pattern by a pulse deinterleaving process on at least one said target object transponder reply, (h) determining a matched pulse pattern for at least one said target pulse repetition pattern that correlates with said base pulse repetition pattern of said interrogation signal source, (i) determining at least one target object relative bearing angle BT by measuring the phase of the amplitude modulation envelope on said matched pulse pattern with respect to said antenna rotation reference signal, (j) determining at least one interrogation signal source object range r by use of signal strength versus range transformation calculations for said base pulse repetition pattern signal pulse amplitudes, (k) determining the speed of rotation of said interrogation signal source antenna by measuring the time interval between successive sweeps past said observer object, (l) determining an inscribed angle BS from said speed of rotation by measuring a time between said target pulse repetition replies and said interrogation signal source antenna illumination of said observer object, (m) generating a continuous synchronous predicted interrogation signal source pulse repetition pattern between successive sweep updates of said interrogation signal source antenna past said observer object, (n) determining a time difference in arrival between receipt of said target pulse repetition pattern pulses and the receipt of said synchronous predicted interrogation signal source pulse repetition pattern pulses, (o) calculating del, the sum of the distance from said interrogation signal source to said target object plus the distance from said target object to said observer object minus the distance r from said interrogation signal source to said observer object from said time difference in arrival, (p) calculating at least one target object range t by using said representations r, BS and del, (q) calculating the relative position of the observer object from at least one said target object using said representations BT and t.

3. A method for determining the relative position of an observer object from at least one set of target object transponder replies by measuring bearing and range from said observer object in an environment having at least one rotating pulsed synchronous or non synchronous interrogation signal source, said method comprising:

(a) receiving said interrogation signal source and said target object reply signals with a multi element antenna, (b) varying the attenuation of each of said multi element antenna received signal paths with time to result in a rotating shaped antenna pattern in space, (c) controlling said shaped antenna pattern rotation rate to be at least one revolution during each said interrogation signal source beam passage over said target object, (d) generating an antenna rotation reference signal each time said shaped antenna pattern maximum received signal position passes a specified reference direction angle, (e) summing said multi element antenna signal paths onto a single microwave receiver channel, (f) determining a base pulse repetition pattern on at least one set of said interrogation signal source signals by a pulse deinterleaving process, (g) determining a target pulse repetition pattern by a pulse deinterleaving process on at least one said target object transponder reply, (h) determining a matched pulse pattern for at least one said target pulse repetition pattern that correlates with said base pulse repetition pattern of said interrogation signal source, (i) determining at least one target object relative bearing angle BT by measuring the phase of the amplitude modulation envelope on said matched pulse pattern with respect to said antenna rotation reference signal, (j) calculating at least one target object range t by use of signal strength versus range transformation calculations for said matched pulse pattern target object pulse repetition pattern pulse amplitudes, (k) calculating the relative position of the observer object from at least one said target object using said representations BT and t.

* * * * *